SIGNALING ARRANGEMENT FOR ELECTRONIC SWITCHING SYSTEMS

Original Filed Feb. 19, 1946 4 Sheets-Sheet 1

INVENTOR.
DAVID H. RANSOM

BY

R. P. Morris
ATTORNEY

SIGNALING ARRANGEMENT FOR ELECTRONIC SWITCHING SYSTEMS

Original Filed Feb. 19, 1946 4 Sheets-Sheet 2

INVENTOR.
DAVID H. RANSOM

BY

R P Morris
ATTORNEY

SIGNALING ARRANGEMENT FOR ELECTRONIC SWITCHING SYSTEMS

Original Filed Feb. 19, 1946 4 Sheets-Sheet 3

INVENTOR.
DAVID H. RANSOM

BY

R. P. Morris
ATTORNEY

SIGNALING ARRANGEMENT FOR ELECTRONIC SWITCHING SYSTEMS

Original Filed Feb. 19, 1946 4 Sheets-Sheet 4

INVENTOR.
DAVID H. RANSOM

BY

R. P. Morris

ATTORNEY

Reissued Oct. 16, 1951

Re. 23,418

UNITED STATES PATENT OFFICE 23,418

SIGNALING ARRANGEMENT FOR ELECTRONIC SWITCHING SYSTEMS

David H. Ransom, Paterson, N. J., assignor to Federal Telecommunication Laboratories, Inc., New York, N. Y., a corporation of Delaware Original No. 2,492,179, dated December 27, 1949, Serial No. 648,758, February 19, 1946. Application for reissue December 23, 1950, Serial No. 202,583

11 Claims. (Cl. 179—15)

Matter enclosed in heavy brackets [ ] appears in the original patent but forms no part of this reissue specification; matter printed in italics indicates the additions made by reissue.

This invention relates to new and useful improvements in communication systems and more particularly in telephone systems of the type disclosed in the copending application of E. M. Deloraine, Serial No. 628,613, filed Nov. 14, 1945, *now abandoned.*

The object of the present invention is to provide a *signalling arrangement, for instance for ringing,* [ringing and an improved two-way talking arrangement] for an all-electronic telephone exchange system, i. e. one in which no electromagnetic equipment is used for establishing connections.

With this object in view, I provide an electronic repeater through which two-way signaling may be accomplished, including the sending of a ringing signal from the central exchange to the called line.

In accordance with the embodiment here disclosed two electronic means such as cathode ray tubes are provided in common for the lines. Signals such as dial and speech signals may be sent from both the calling and the called lines through one of the cathode ray tubes, and signals such as speech and ringing signals may be sent to the line through the other cathode ray tube.

These and other features of the invention will more readily appear from the appended claims and the following detailed description of a preferred embodiment, of which as much as is necessary for an understanding of the invention is illustrated in Figs. 1 to 4 of the drawings. In reading the drawings, Fig. 2 should be placed below Fig. 1, Fig. 4 to the right of Fig. 2 and Fig. 3 to the right of Fig. 1, Figs. 1 and 3 being kept horizontal and Figs. 2 and 4 vertical.

Figure 1:
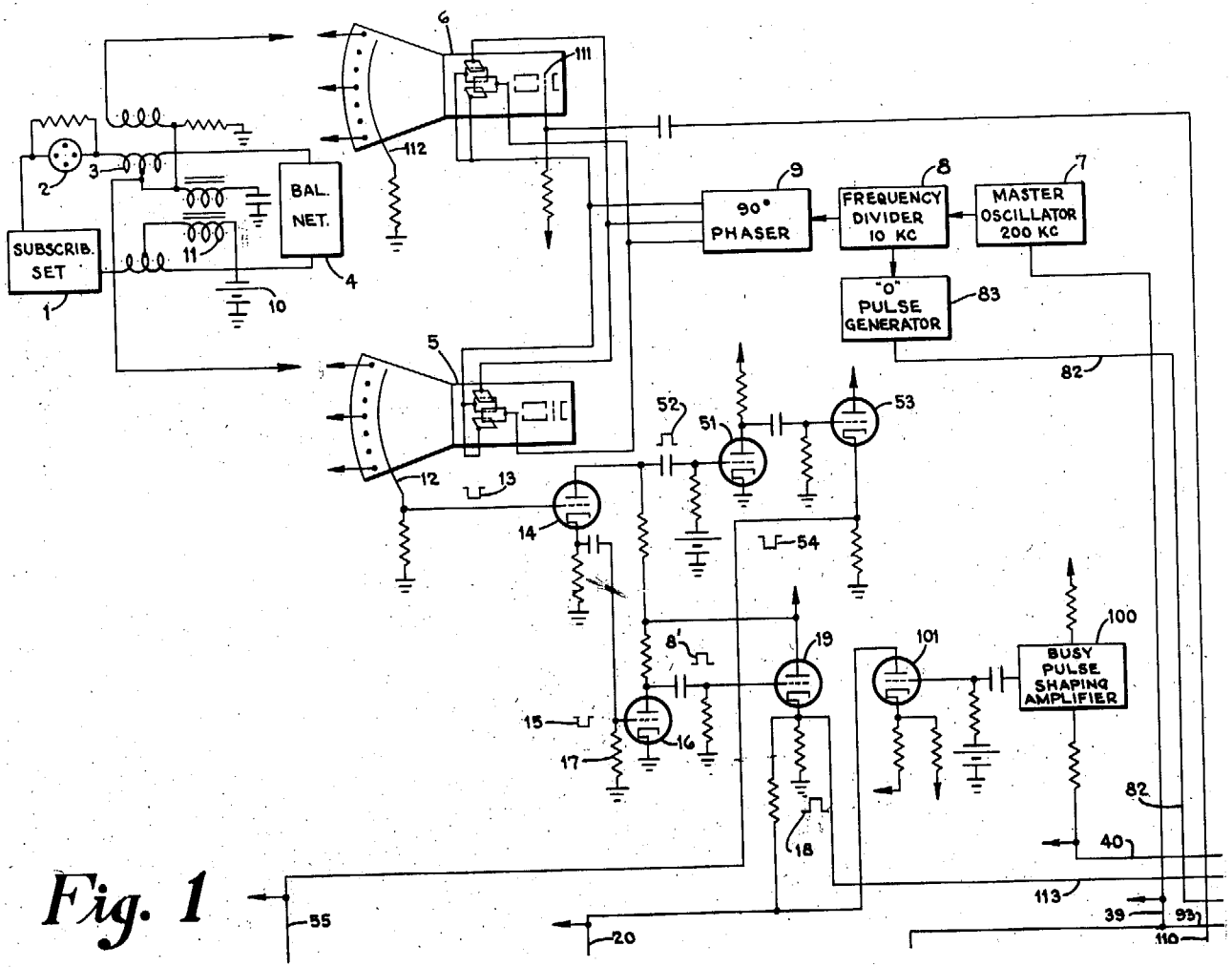
Figure 2:
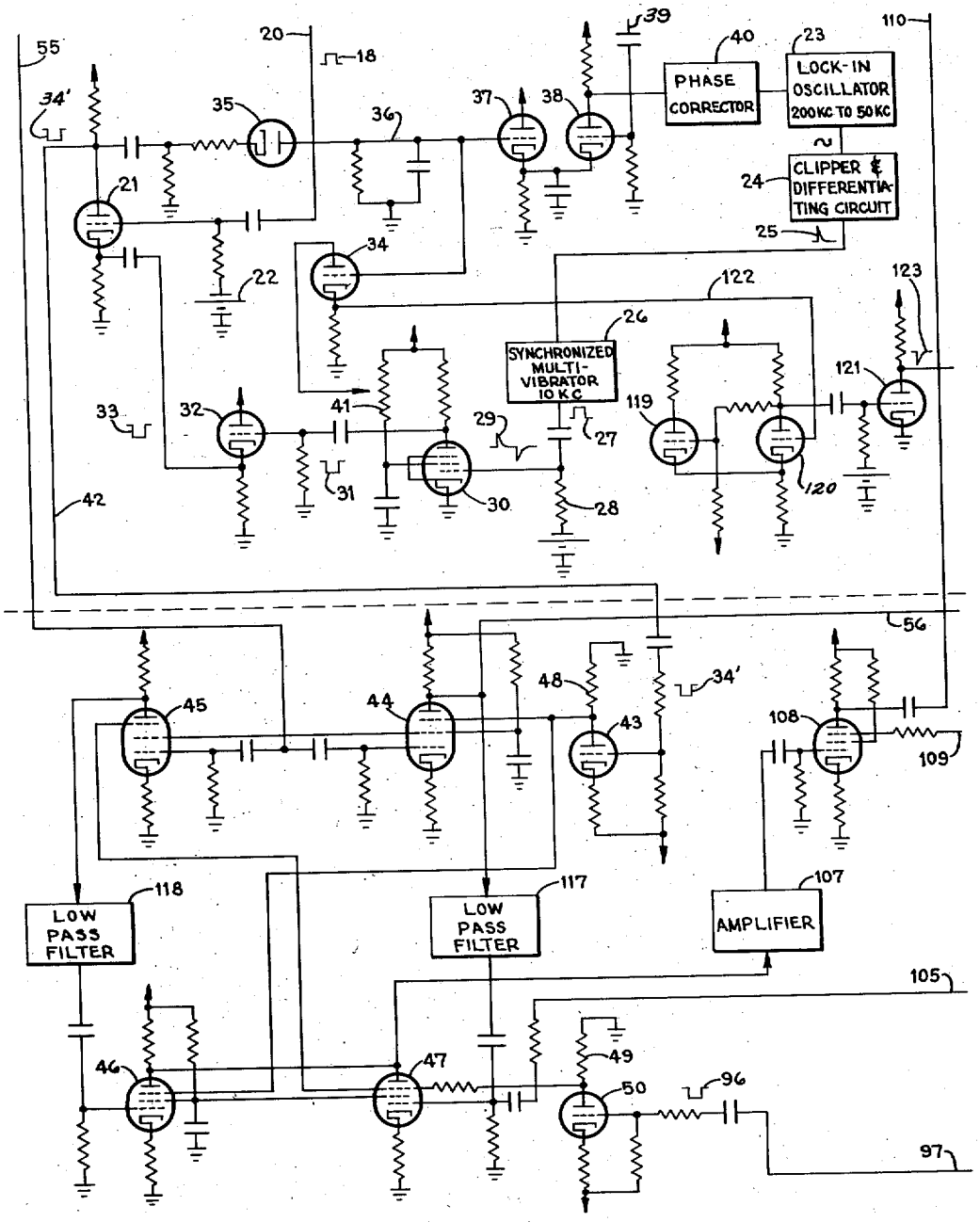
Figure 3:
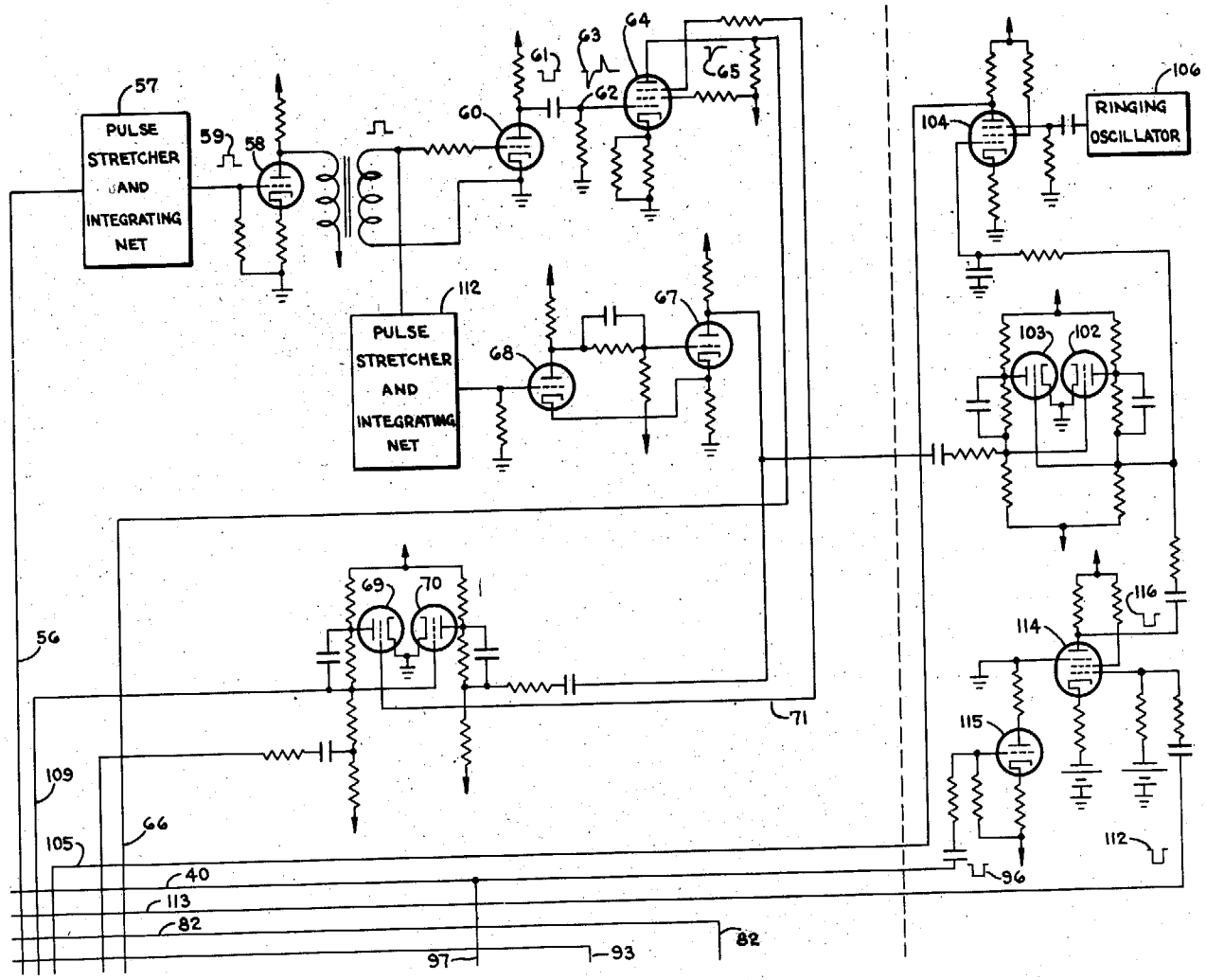
Figure 4:
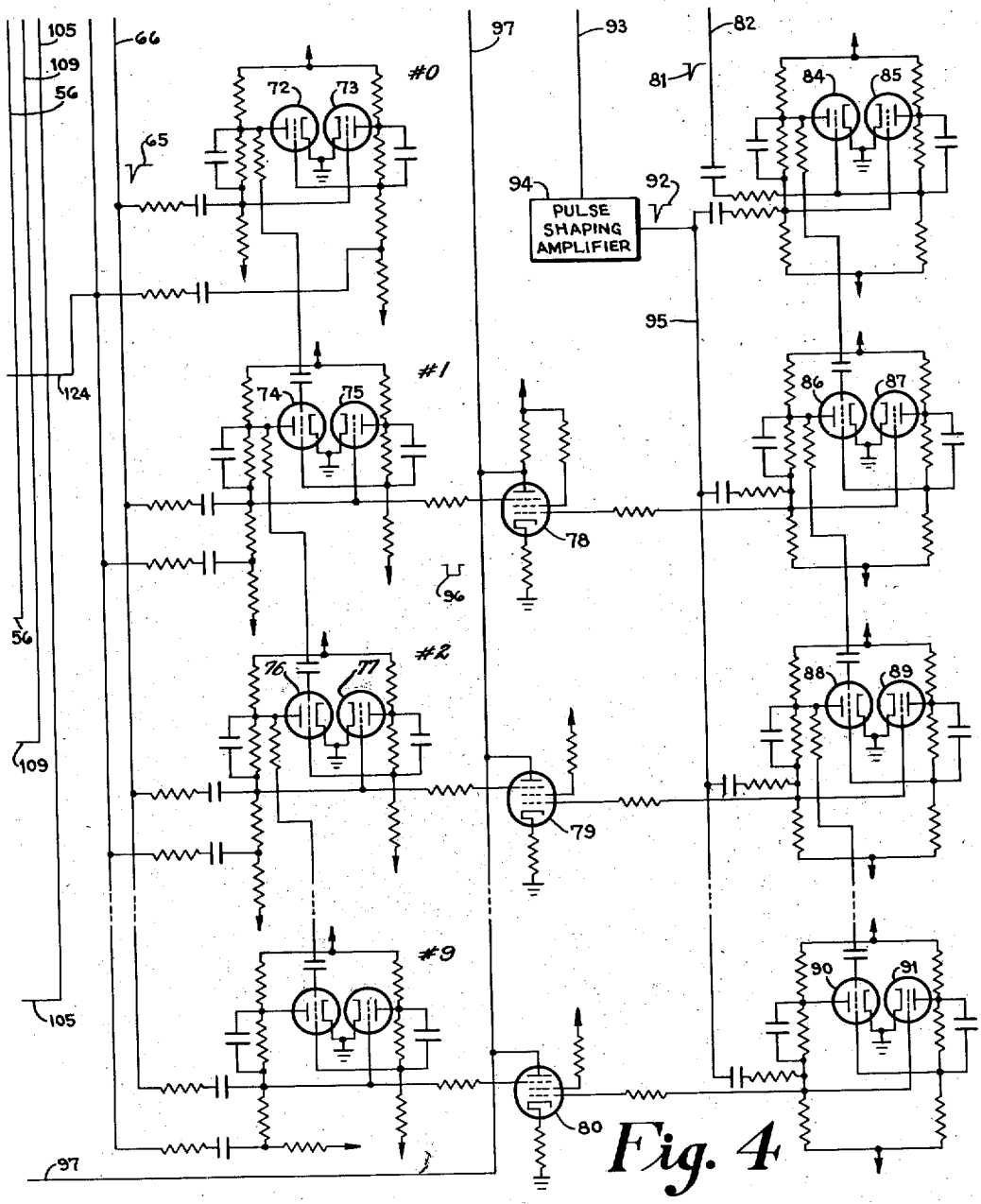

Fig. 1 shows the substation equipment of one line and the two electronic means and associated equipment common to the lines, the upper part of Fig. 2 the line finder, and the lower part the talking circuit and signal repeater equipment, Fig. 4, the registering and line selecting equipment and Fig. 3 the dial pulse and ringing equipment.

Each subscriber's line is provided with a subset 1 of any conventional type, a calling dial 2 by means of which, in the embodiment here disclosed, one to twenty impulses may be sent depending on the designation of the called line, a hybrid coil 3, and a balancing network 4. The interconnection of calling and called lines is effected by means of a pair of cathode ray tubes of which 5 is employed for receiving signals (including speech) from the line and 6 for transmitting signals (including speech, ringing, and the like) to the lines. The lines terminate on electrodes forming dynodes in the cathode ray tubes, one winding of the hybrid coil 3 being connected to terminal electrodes of tube 5 and another winding to the electrode terminals of tube 6. Each tube is equipped with the customary gun structure and deflecting means for the purpose of sweeping cyclically and in succession the line terminal electrodes provided therein. The beams of these tubes may, for instance, rotate (assuming that the line terminals are arranged in a circle) under the control of a master oscillator 7 operating at 200 kc. and connected in multiple with the deflecting plates of the two tubes through a 10 kc. frequency divider 8 and a 90° phaser 9, insuring a repetition rate of 10 kc. per second of the scanning beam.

When the subscriber at station 1 initiates a call the operation of the switch hook (not shown) at the subset 1 places a negative potential on the anode 12 through the dynode of the calling line in the receiving tube 5 over a circuit extending from the negative pole of grounded battery 10 over a retardation coil 11, a loop including the secondary of the hybrid coil 3, the subset 1, and dial 2. This causes a flow of electrons from the terminating electrode in the tube to anode 12 each time the scanning beam sweeps over the dynode of this line. The resulting negative pulse 13 is fed to the grid of a cathode follower and inverter tube 14. The negative pulses 15 in the cathode output of tube 14 are applied to the grid of a clipper amplifier tube 16. Tube 16 is normally biased by resister 17 to draw current, and the signal amplitude is so adjusted that each negative pulse 15 will drive the tube 16 beyond cut-off whereupon the tube will clip variations caused in the signal by dial pulses or transmitter modulation.

The positive pulse 8′ appearing in the plate output of tube 16 is fed to the grid of cathode follower 19 and through the cathode thereof to conductor 20 which is multiplied to the grids of all line finder gate tubes 21.

The line finder gate tubes 21 are normally biased through battery 22 far enough beyond cut-off so that the incoming positive pulse 18 will not affect their plate output.

A lock-in oscillator 23 in the line finder operates at a frequency slightly below the rate of scanning in the tubes 5 and 6 (200 kc.), and divides this output to a frequency of approximately 50 kc. The sine wave output of oscillator 23 passes through a clipping amplifier and differentiating circuit 24 in the form of pulses 25 to a multi-vibrator 26 arranged to synchronize at approximately 10 kc. The output pulses 27 of a multi-vibrator 26 are differentiated in a network 28 and the resulting pulses 29 are applied to the control grid of a clipper gate tube 30. The constant and the bias of this gate tube are adjusted so as to produce by the leading edge of the differentiated pulses 29 in the plate circuit thereof a short square pulse 31 of approximately 5 microseconds duration. The trailing edge of the pulses 29 is suppressed in tube 30.

The negative pulse 31 is passed through a cathode follower 32 as pulse 33 which is applied to the cathode of the line finder gate 21. The amplitude of pulse 33 is adjusted by delay gain tube 34 so that normally the line finder gate tube 21 remains cut-off. This gate has a positive pulse 18 applied to its grid and a negative pulse 33 to its cathode, neither of which will drive it beyond cut-off to produce conduction. Since the lock-in oscillator 23 has a frequency which is slightly less than that of the master oscillator 7, the pulse 33 will drift with respect to the pulse 18 until the two will occur simultaneously whereupon the bias of the line finder gate tube is overcome. When this happens then a negative signal 34' appearing in the plate is passed through a rectifier 35 and an integrating net 33 to the grids of the delayed gain tube 34 and of the gate control tube 37. The latter will be driven to cut off after a few pulses 34' have reached it, permitting the lock-in gate tube 38 to pass a signal received from the master oscillator 7 over a wire 39. The output of the lock-in gate tube 38 will synchronize oscillator 23 with oscillator 7. A phase corrector 40 inserted between the plate of grid 38 and the oscillator 23 insures accurate adjustment.

The portion of the rectified output of rectifier 35 which was fed to the grid of the delayed gain tube 34 will drive the latter beyond cut-off after a few pulses. The plate of tube 34 and the screen grid of clipper gate 30 are connected to a common resistor 41. The screen voltage of gate 30 will, therefore, rise and will cause an increase in the amplitude of pulse 31 and, therefore, of pulse 33 which is the pedestal pulse applied to the cathode of line finder gate 21. This will cause the grid of tube 21 to be driven positive by the pulse 18 and clipping by grid current will occur. However, the amplitude of the incoming pulse 18 will be insufficient to affect the line finder gate tube of any other link.

The output pulses 34' of the line finder gate are applied also over conductor 42 to the grid of an input gate control tube 43. The plate of tube 43 is connected in multiple to the suppressor grids of two tubes; one of these is an input gate tube 44 whose pair is 45, and the other is an output gate tube 46 whose pair is 47. The two pairs of input and output gate tubes 44 and 46 are normally biased to cut off on the suppressor grid by the voltage drop in plate resistor 48 of the input gate control tube 43. Similarly, the input and output gate tubes 45 and 47 are normally biased to cut off on their suppressor grids by the voltage drop in plate resistor 49 of output gate control tube 50.

The negative pulse 34' coming from the line finder gate drives the grid of control tube 43 beyond cut-off which will reduce the voltage drop across its plate resistor 48 to zero. This will raise the bias on the suppressor grids of gates 44 and 46, permitting the passage of signals which may appear on the control grids of these gate tubes.

It is assumed that speech and dial pulses will modulate the line signal at, say, 25%. The clipping action of tube 16 will cut off the modulated portion so that the pulse 18 which is applied to the line finder gate will be uniform. However, a cipper tube 51 is so biased that only the modulated portion of a positive pulse 52 applied thereto by the inverter 14 will appear in the grid of a cathode follower 53. Cathode output 54 of tube 53 is applied over conductor 55 to the control grids of the input gate tubes 44 and 45 in all links but will affect only the pair whose control tube 43 is operated by the pulses 34.

The pulses produced by the dial 2 of the calling line will thus be transmitted as pulses 34' through gate control 43, and through the plate of input gate 44 over conductor 56 and a pulse stretcher and integrating network 57 to the grid of an amplifier 58 in the form of positive pulses 59. These low frequency dial pulses 59 are amplified by tube 58 and shaped in a clipper tube 60 to form negative square wave pulses 61. The pulses 61 are differentiated in a network 62 into pulses 63 which are applied to the control grid of dial gate tube 64. The latter is biased so that the leading edge of the differentiated pulse 63 is suppressed and the trailing edge thereof is passed as a negative pulse 65 over conductor 66 to the register circuits.

The pulses 59 are passed in parallel over a pulse stretcher and integrating net 112, and the leading edge of the first pulse of a series flips conduction from tube 67 to tube 68 in the dial gate control. The circuit constants are such as to maintain this condition until the end of the dial pulses when tube 67 again becomes conducting and sends a negative pulse to the dial gate control 69, 70 and to the ringing gate control 102, 103. The output of tube 70 is applied over conductor 71 to the suppressor grid of dial gate 64, biasing the latter to cut off. This will lock out the register so as to protect it against transients.

The register circuits are also conventional Eccles-Jordan trigger circuits connected to form a strip count. Initially, the right-hand tube 73 of the No. 0 register and the left-hand tube 74 in the No. 1 register and of all subsequent registers are conducting. The first negative pulses 65 on conductor 66 will transfer conduction in the No. 0 register from tube 73 to tube 72. The negative pulse appearing in the plate of tube 72 will be applied to the grid of tube 74 in the No. 1 register so as to transfer conduction to tube 75 of the latter.

The next pulse 65 will produce the same operations as above explained, except that now registers Nos. 1 (74, 75) and 2 (76, 77) will be involved. After a series of pulses 65, representing the dial pulses at the calling station, have been received, the right-hand tube of one of the registers will be in conducting condition. A potential will be applied to the suppressor grid of the corresponding time channel gate tube 78, 79 or 80 associated with this register, permitting the passing of a signal from the control grid of the time channel gate.

The line selecting circuit proceeds now to count the digit pulses as set in the register, synchronizing on each count with a zero pulse 81 applied to the No. 0 counter over a conductor 82 from a zero pulse generator 83 which is driven by the 10 kc. frequency divider 8.

Normally, the left-hand tubes 84, 86, 88, etc. 90 of the counters are conducting. The synchronizing pulse 81 flips conduction in the No. 0 counter from tube 84 to tube 85. Negative pulses 92 which are derived from master oscillator 7 over conductors 39 and 93 and a pulse-shaping amplifier 94 at 5 microsecond intervals are applied over a common conductor 95 to the grids of all the right-hand counter tubes 85, 87, 89 and 91.

The negative pulse 92 following the synchronizing pulse 81 will transfer conduction in the No. 0 counter from tube 85 to tube 84. The negative pulse appearing in the plate circuit of 84 is applied to the grid of the left-hand tube 86 in the No. 1 counter and will flip conduction to 87.

Each successive pulse 92 will flip a counter so as to make its right-hand tube conducting until all the counters are operated, whereupon the final pulse restores the circuit to normal. Depending on the register which is operated, one of the time channel gate tubes 78, 79, (etc) or 80 will permit the passage of a signal which is applied to its control grid by the right-hand tube of the operated counter, and this pulse 96 is transmitted over conductor 97 to the control grid of the output gate control tube 50. If, for example, the No. 1 register is conducting on its right-hand tube 75, then the positive bias on it is transferred to the suppressor grid of time channel gate tube 78, so that when the No. 1 counter flips conduction to its right-hand tube 87 a negative signal 96 will be generated on the plate of tube 78.

The negative pulse 96 is applied over conductors 97 and 40, and a busy pulse-shaping amplifier 100 of the grid of a busy gate tube 101 whose output added to the pulse 18 appearing in conductor 20 when the beam of 5 sweeps the called line will prevent the operation of a line finder gate tube like 21 when the called subscriber answers.

At the end of a series of dial pulses a negative pulse in the output of dial gate control tube 67 will flip conduction from a tube 102 to a tube 103 in the ringing gate control forming part of the ringing circuit. This will permit a ringing gate tube 104 to send a ringing signal over conductor 105 to the control grid of the output gate tube 47. Whenever the beam of the sending tube 6 sweeps over the dynode in which the called line terminates, ringing signal is applied through the following circuit: From a ringing oscillator 106 to the suppressor grid of ringing gate 104 which has been made operative by the potential applied to its control grid by the ringing gate control, the plate of tube 104, conductor 105, the control grid of output gate tube 47, the plate of tube 47, amplifier 107, the control grid of a pentode 108 whose suppressor grid is controlled over conductor 109 by the dial gate control 69, 70, the plate of tube 108, conductor 110 and the control grid 111 of the sending tube 6. The grid 111 will so control the beam when it impinges on the dynodes of the called line as to cause the operation of a ringer at the called station.

When the beam of tube 5 next engages the terminals of the called party who has answered, the positive pulse 18 on the cathode of triode 19 will be applied over conductor 113 to the control grid of trip ringing tube 114. This tube is now open by virtue of a positive pulse applied to its suppressor grid by triode 115 which, in turn, is made at this instant conductive by pulse 96 applied to it by the corresponding time channel gate over conductor 97.

Negative pulses 116 produced in the plate of 114 will flip conduction from 103 to 102 in the ringing gate control whereupon ringing will stop.

The circuit is now ready to pass speech signals. Speech signals produced in the calling line will be sent when the dynode of this line is swept by the beam of receiver tube 5 over the anode 12, the cathode follower 14 to the clipper tube 51, and thence to the cathode follower 53 and over conductor 55 to the control grid of the input gate tube 44. From the plate of input gate tube 44, the signal goes through a low pass filter 117 where it is transformed from a series of pulses to the original speech frequency signal and applied to the control grid of the output gate 47. From the plate of the output gate the signal passes through the amplifier 107, the tube 108 and conductor 110 to the control grid 111 of the sending distributor 6, and through the appropriate dynode thereof to the called line.

The path of the speech signals from the called line to the calling line will be the same as above described but it will occur when the receiving distributor 5 sweeps over the dynode of the called line and the distributor 6 sweeps over the dynode of the calling line. Furthermore, the pulses 54 applied over conductor 55 will not affect the input gate 44 but the input gate 45 through whose plate it will be conveyed via another low pass filter 118 to the control grid of the output gate tube 46, the output circuit of which is in multiple with the output circuit of the gate 47.

It will be seen, therefore, that the timing of the two functions is reversed, the input gate control tube 43 operating input gate 44 and output gate 46, and the output gate control tube 50 controlling the input gate tube 45 and the output gate tube 47.

At the termination of a call, when the calling subscriber hangs up, all circuits are released under the control of the delayed gain tube 34. The register circuit and the dial gates which are locked in are released by the release tube 119, 120, and 121. When the call is initiated the delay gain tube 34 is driven to cut-off, reducing the potential on the grid of tube 120 which is connected with the cathode of the delay gain tube 34 over conductor 122. This causes the obvious flip-flop circuit to transfer conduction to tube 119 which sends a negative pulse through a differentiating network to the grid of tube 121. The latter is biased beyond cut-off and the pulse has no effect. When, however, the line finder 21 releases, then 119 again becomes conductive and applies a positive pulse to the grid of 121. A negative pulse 123 will then be applied to the conductor 124 which will restore all the registers and the dial gate control tubes to normal.

What I claim is:

1. In a communication system, a plurality of lines, two electronic means common to said lines, each having a plurality of electrodes in which the lines terminate and means for cyclically sweeping with an electron beam the electrodes, a control grid for the beam of the first of said means, a signal repeater having an output connected with said control grid, timing means for applying to the repeater signals originating on calling and called lines when the beam of the second of said electronic means sweeps over their terminals, a ringing circuit common to said lines, line selecting means common to said lines, means associated with the calling line to operate the selecting means to select the called line, and means operative thereupon for operating the repeater by the ringing circuit.

2. In a communication system, a plurality of lines, electronic means common to said lines and having a plurality of electrodes in which the lines terminate and means for cyclically sweeping with an electron beam the electrodes, a control grid for the beam, a source of signals common to said lines, said source comprising a ringing oscillator, a trigger circuit, means controlled by the timing means for operating said trigger circuit to connect the ringing oscillator with the repeater, and means controlled by the called line for operating said trigger circuit to disconnect the ringing oscillator, a signal repeater having an output connected with said control grid, timing means for applying to the repeater signals originating on calling and called lines when the beam of said electronic means sweeps over their terminals, and means controlled by said timing means for applying signals from said source to the repeater when the beam sweeps over the terminal of the called line.

3. In a communication system, a plurality of lines, electronic means common to said lines and having a plurality of electrodes in which the lines terminate and means for cyclically sweeping with an electron beam the electrodes, a control grid for the beam, a source of signals common to said lines, said source comprising ringing oscillator, a ringing gate tube having a cathode, an anode, a suppressor grid with which said oscillator is connected and a control grid, a connection from the anode to said repeater, a trigger circuit connected with said control grid, means controlled by the timing means for operating said trigger circuit, and means controlled by the called line for operating said trigger circuit, a signal repeater having an output connected with said control grid, timing means for applying to the repeater signals originating on calling and called lines when the beam of said electronic means sweeps over their terminals, and means controlled by said timing means for applying signals from said source to the repeater when the beam sweeps over the terminal of the called line.

4. In a telephone system, a plurality of lines, two electronic means common to said lines, each having a plurality of electrodes in which the lines terminate and means for cyclically sweeping with an electron beam the electrodes, a control grid for the beam of the first of said means, a signal repeater having an output connected with said control grid, timing means for applying to the repeater signals originating on calling and called lines when the beam of the second of said electronic means sweeps over their terminals, a ringing oscillator, a ringing gate tube having a cathode, an anode, a suppressor grid with which said oscillator is connected and a control grid, a connection from the anode to said repeater, a trigger circuit connected with said control grids, means controlled by the timing means for operating said trigger circuit, and means controlled by the called line for operating said trigger circuit.

5. In a telephone system, a plurality of lines, two cathode ray tubes common to said lines, each having a plurality of electrodes in which the lines terminate and means for cyclically sweeping with an electron beam the electrodes, a control grid for the beam of the first tube, a signal repeater comprising two input and two output gate tubes, each of said gate tubes having a cathode, an anode, a control and a suppressor grid, means including the second cathode ray tube for applying signals originating on the calling and called lines to the control grids of the input gates, connections including low pass filters from the anodes of the input gates to the control grids of the output gates, a connection for applying a potential to the suppressor grids of one input and one output gate controlled by the calling and called lines when their terminals are swept by the beam of the second cathode ray tube, a connection from the anodes of the output gates to the control grid of the first cathode ray tube, a connection for applying a potential to the suppressor grids of the other input and output gates when the beam of the second cathode ray tube sweeps over the terminals of the called line, a ringing oscillation generator, and means for connecting said generator with the control grid of the other output gate when the beam of the first cathode ray tube sweeps over the terminals of the called line.

6. In a communication system, a plurality of lines, electronic means common to said lines and having a plurality of electrodes in which the lines terminate and means for cyclically sweeping with an electron beam the electrodes, a control means for the beam, a signal repeater having an output connected with said control means, timing means for applying to the repeater signals originating on calling and called lines, a ringing circuit common to said lines, line selecting means common to said lines, means associated with the calling line to operate the selecting means to select the called line, and means operative thereupon for operating said repeater by the ringing circuit.

7. In a communication system, a plurality of lines, electronic switching means including a plurality of devices having space discharge paths, means for establishing a connection between a calling and a called line solely through the space discharge paths of said devices in said electronic switching means, a ringing circuit common to said lines, and electronic means comprising devices having discharge paths operative upon the establishment of said connection for connecting the ringing circuit with the electronic switching means to ring the called line.

*8. The system according to claim 1, signalling means common to said lines, line selecting means common to said lines, means associated with the calling line to operate the selecting means to select the called line, and means operative thereupon for associating said signalling means with said repeater.*

*9. In a communication system, a plurality of lines, electronic means common to said lines and having a plurality of electrodes in which the lines terminate and means for cyclically sweeping the electrodes with an electron beam, a control grid for the beam, a source of signals common to said lines, a signal repeater having an output connected with said control grid, timing means for applying to the repeater signals originating on calling and called lines when the beam of said electronic means sweeps over their terminals, and means controlled by said timing means for applying signals from said source to the repeater when*

*the beam sweeps over the terminal of the called line.*

*10. The system according to claim 9, and means for disabling the last-mentioned means controlled over the called line.*

*11. The system according to claim 9, and in which said source comprises an oscillator, a connection for actuating said repeater by said oscillator, means controlled by the timing means for establishing said connection and means controlled by the called line for disestablishing said connection.*

DAVID H. RANSOM.

REFERENCES CITED

The following references are of record in the file of this patent or the original patent:

UNITED STATES PATENTS

| Number | Name | Date |
|---|---|---|
| 2,214,019 | Gray | Sept. 10, 1940 |
| 2,239,825 | Lomax | Apr. 29, 1941 |
| 2,241,031 | Holden | May 6, 1941 |
| 2,257,795 | Gray | Oct. 7, 1941 |
| 2,289,503 | Koechling | July 14, 1942 |
| 2,379,715 | Hubbard | July 3, 1945 |
| 2,387,018 | Hartley | Oct. 16, 1945 |